Figure 1:
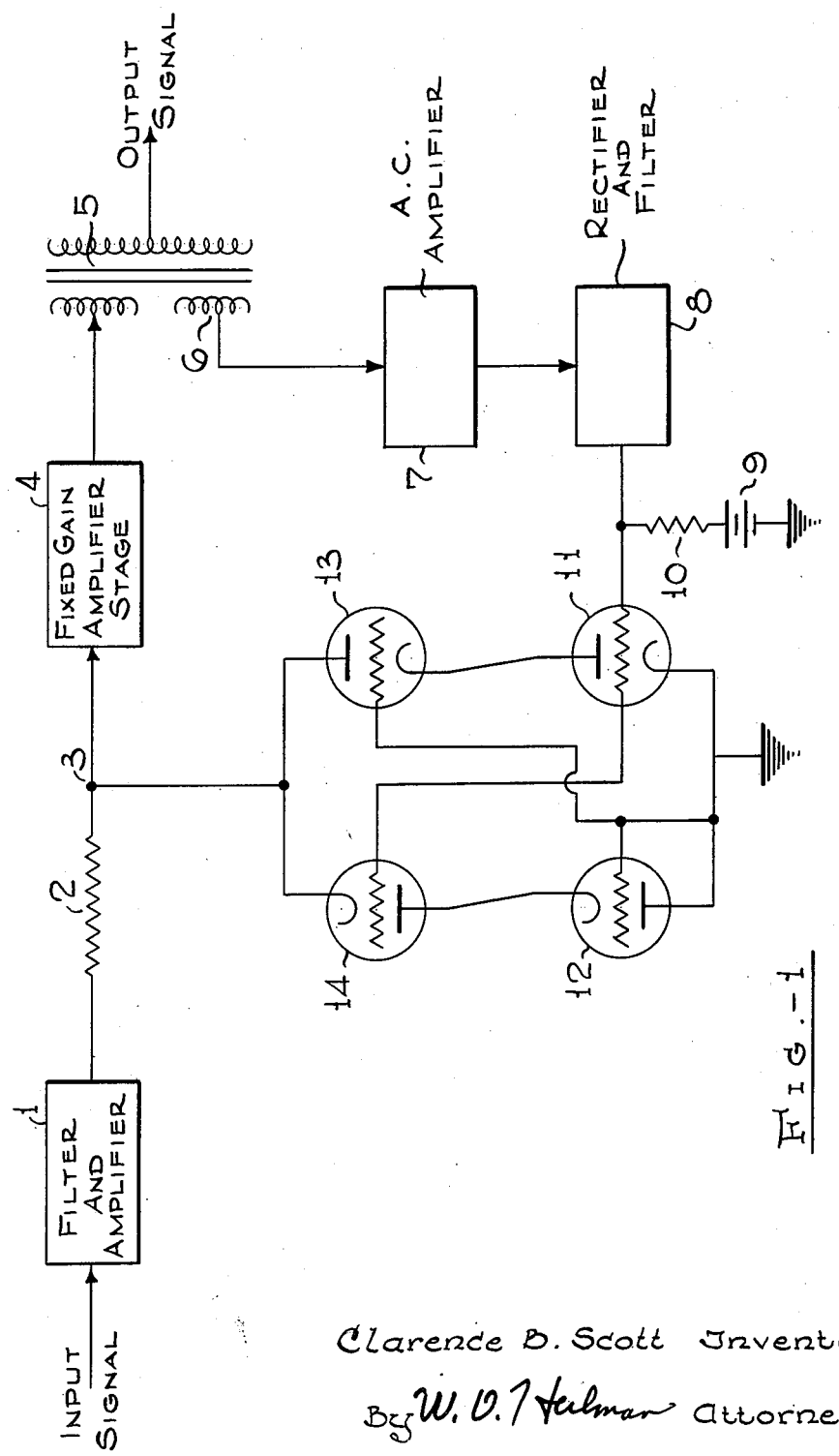

Feb. 12, 1952          C. B. SCOTT          2,585,854

AUTOMATIC VOLUME CONTROL FOR SEISMIC AMPLIFIERS

Filed Oct. 27, 1949          2 SHEETS—SHEET 1

Clarence B. Scott   Inventor

By W. O. Hulman   Attorney

Feb. 12, 1952 C. B. SCOTT 2,585,854
AUTOMATIC VOLUME CONTROL FOR SEISMIC AMPLIFIERS
Filed Oct. 27, 1949 2 SHEETS—SHEET 2

Clarence B. Scott Inventor
By W. O. ? Heilman Attorney

Patented Feb. 12, 1952

2,585,854

UNITED STATES PATENT OFFICE 2,585,854

AUTOMATIC VOLUME CONTROL FOR SEISMIC AMPLIFIERS

Clarence B. Scott, Tulsa, Okla., assignor to Standard Oil Development Company, a corporation of Delaware Application October 27, 1949, Serial No. 123,926

3 Claims. (Cl. 179—171)

1

The present invention relates to a novel electronic circuit and to the use of such a circuit for automatic volume control. More particularly the invention relates to a novel arrangement for providing automatic volume control in amplifier circuits for seismic recording.

One well-known technique of exploration for oil or other mineral deposits comprises seismic prospecting or reflection seismography wherein a hole is drilled into the earth and an explosive shot or other means of producing sound is placed in the hole. The sound source is actuated and the sound waves traveling through the earth are detected at various points on the surface of the earth by means of sensitive pick-ups or geophones which translate the detected sound waves into electrical impulses which after suitable amplification can be recorded on a seismograph. Conventionally, a seismograph record is obtained by means of a number of moving coil galvanometers each one of which has a mirror attached thereto, the galvanometers being arranged in a battery in connection with a source of light in such relation to a moving strip of sensitized paper or film that there will be recorded on the paper or film a plurality of wave forms or traces representative of the sound waves which have been picked up by the individual geophones, suitably amplified, and fed to the galvanometers. Many seismograph instruments are capable of recording as many as 24 individual traces simultaneously. The strip of paper or film is moved longitudinally at a substantially constant speed and is provided with suitable timing marks so that when the seismograph record or seismograph is later examined it is possible to determine the length of time required for the arrival of sound waves at any particular point on the earth's surface either directly from the sound source or by reflection from underlying strata.

Since the wave energy force received by the geophone varies considerably in magnitude the amplification between each geophone and corresponding galvanometer must be continuously varied to cause the trace to be of usable size on the record paper. One suitable method for producing the desired range of amplitude control in seismograph amplifier circuits is to provide for one or more stages of fixed gain amplification and filtering together with an amplification stage having variable gain in conjunction with an automatic volume control loop. The present invention is concerned with the provision of improved automatic volume control in conjunction with such variable gain amplification. A desirable method of obtaining such variable gain is to employ fixed amplification in combination with variable attenuation. A convenient method for obtaining variable attenuation is to feed the signal through a voltage divider the two arms of which comprise a fixed resistor and a variable electronic resistor. The output signal from the attenuator amplifier stage is amplified, rectified and fed into the voltage divider through the variable electronic resistor to give the desired variable attenuation.

Thus one object of the present invention is to provide a variable electronic resistor for use with a fixed resistor to form a voltage divider which will furnish variable attenuation in the automatic volume control loop of an amplifier circuit. Other objects of the present invention will be apparent from the ensuing description and from the drawings in which Fig. 1 is a schematic diagram of a portion of an amplifier circuit including an automatic volume control loop in which the electronic resistor of this invention is employed and Fig. 2 is a substitute circuit for an electronic resistor which may be used in the circuit of Fig. 1.

Figure 2:
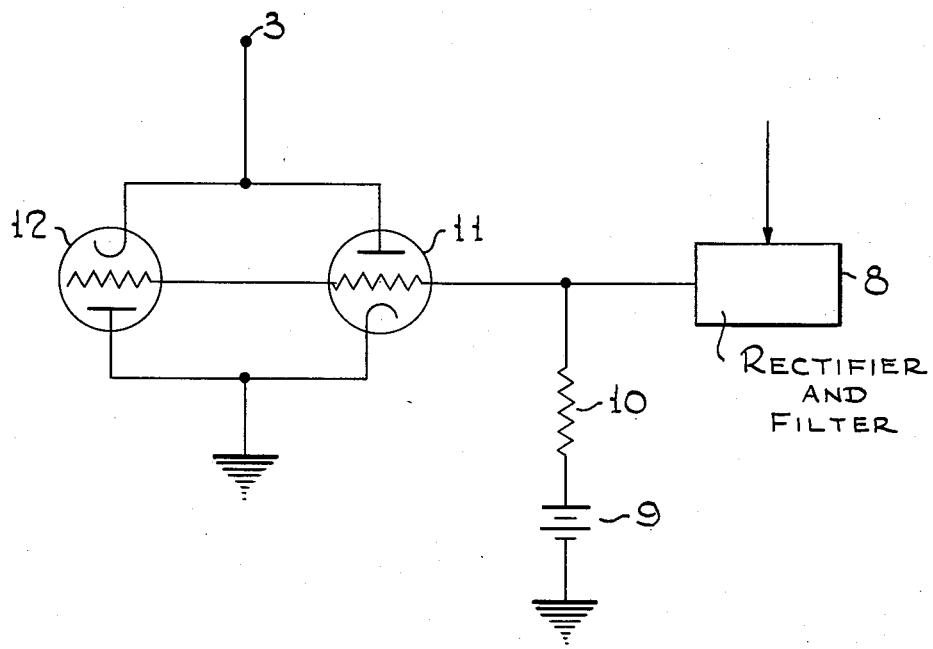

Referring specifically to Fig. 1 a signal such as one received from a geophone is fed into a filter and amplifier circuit 1 and then through a fixed resistor 2 to a fixed gain amplifier stage 4. The signal from stage 4 is fed to an output transformer 5 and then to the recording galvanometer of the seismograph. By means of a third winding 6 on transformer 5 part of the output signal is amplified and fed back to amplifier stage 4 through A. C. amplifier 7, rectifier and filter 8 and an electronic resistor circuit comprising vacuum tubes 11, 12, 13 and 14. This vacuum tube circuit which is connected to resistor 2 at terminal 3 forms with the latter resistor the aforementioned voltage divider which provides for the desired attenuation.

Referring specifically to the electronic resistor circuit the rectified signal from rectifier 8 is fed through resistor 10 onto the control grid of tube 11. It will be seen that two pairs of tubes are employed in which the cathode of one tube is tied to the plate of a second. In the arrangement shown the cathode of tube 11 is connected to the plate of tube 12, the cathode of tube 12 to the plate of tube 14, the cathode of tube 14 to the plate of tube 13, and the cathode of tube 13 to the plate of tube 11. The control grids of tubes 12 and 13 are tied to the common ground of the circuit and the control grids of tubes 11 and 14 are tied to resistor 10. The cathode of tube 14 and the plate of tube 13 are tied to resistor 2 at terminal 3 and thus constitute one terminal of the electronic resistor, the other terminal being the common ground of the circuit. A negative bias voltage is applied to the grids of tubes 11 and 14 from potential source 9 through resistor 10, sufficient voltage being furnished to bias these tubes to cutoff in the absence of any signal. For example, with 6SL7 tubes potential source 9 may be one furnishing about 3 volts and resistor 10 may have a resistance of about 100,000 ohms.

Filter and amplifier network 1 may be of any suitable design, its function being to amplify the incoming signal to a level suitable for recording on the seismograph and for filtering out signals which do not contribute to the interpretation of the record. A suitable network will be one that provides for amplification factors of say 100 to 3000 and which is adapted to filter out signals having frequencies outside the range which it is desired to record. Thus for seismic work, "ground roll" having frequencies below 15 cycles per second and wind noise having frequencies of 100 cycles or higher would be filtered out by this network. Amplifier 4 will have sufficient amplification to give signals which can be suitably recorded on the seismograph.

Amplifier 7 preferably has an amplification factor of from 10 to 50. Rectifier and filter network 8 is so designed that undesirable ripples are filtered out and so that the filter will have a time constant of about 0.1 second.

The resistance value of resistor 2 will depend on several factors, including the amount of attenuation desired and the resistance of the electronic resistor circuit, i. e., the resistance from point 3 to ground. As a specific example, if the A. C. resistance from point 3 to ground varies from infinity to about 2000 ohms, resistor 2 may suitably have a resistance of about 2 megohms.

The operation of the circuit of Fig. 1 is essentially as follows: When a relatively small input signal is applied to filter and amplifier network 1 and appears on resistor 2 no attenuation of the signal at point 3 occurs because the bias battery 9 has the vacuum tubes biased to cutoff and there is effectively an open circuit from point 3 to ground. The small signal is amplified by the fixed gain amplifier stage 4 and it appears at the output through transformer 5. When the signal is very small no appreciable bias is produced by rectifier and filter 8 and the grids of tubes 11, 12, 13 and 14 remain at cutoff or beyond as determined by the bias battery 9. When a larger signal appears at the input to filter and amplifier stage 1 and then on resistor 2 and then is amplified by amplifier stage 4 and appears on transformer 5, a proportionately larger sample signal will be fed to amplifier 7 and will appear at the output of rectifier and filter 8 as a bias voltage which opposes in direction the voltage of bias battery 9. The IR drop across resistor 10 is then subtracted from the negative voltage of bias battery 9 so that there is less negative bias on the grids of tubes 11, 12, 13 and 14. The tubes will conduct and act as a resistance between point 3 and ground for small alternating current signals (i. e. 0.5 volt or less at point 3). The signal at point 3 is then attenuated according to the ratio of resistance values of resistor 2 and the vacuum tubes. This attenuation in turn acts around the loop to change the bias on the tube grids until equilibrium is reached.

The larger the input signal at filter and amplifier 1 the greater will be the attenuation effect at point 3 so that the net effect at transformer 5, which is the output, will be that the signal will be held almost constant. In practice, for input signal increases of 500 to 1 the output signal will increase only about 2 to 1.

An alternative electronic resistor for use in the automatic volume control loop is shown in Fig. 2 wherein only one pair of vacuum tubes is employed. In this example the plate of tube 11 and the cathode of tube 12 are tied directly to terminal 3 and the cathode of tube 11 and the plate of tube 12 are tied to the common ground of the circuit. The signal from rectifier and filter network 8 is fed through resistor 10 to the grids of tubes 11 and 12. The balance of the circuit is the same as depicted in Fig. 1. The circuit presented in Fig. 1 is preferred over that of Fig. 2 in that it provides for better balance and is not as sensitive to lack of matching between tubes. Although triode tubes are depicted in the diagrams given, it is obvious to those skilled in this art that tetrodes and pentodes may be substituted. Also, it is possible to employ twin tubes wherein two sets of electrodes are contained within the same envelope, in which event, of course, only two of such tubes would be required for the circuit shown in Fig. 1 and only one such tube would be needed in the circuit of Fig. 2, the proper connections being made between the various electrodes, however, just as if each twin tube were two separate tubes.

It will be seen from the foregoing that the essential feature of the present invention is the provision of a novel electronic resistor for use in conjunction with a fixed resistor to form a voltage divider which will serve as a variable attenuator. The variable attenuator is employed to feed a signal into the control point of a fixed gain amplifier stage and to function therewith as an automatic volume controlled amplifier stage of an electronic amplifier circuit. The automatic volume control loop of the amplifier stage comprises means for sampling the output signal from said stage, an amplifier for the sampled signal, and a rectifier-filter network for the amplified sample signal, the output of the rectifier-filter network being fed back into the attenuator stage. The electronic resistor of the invention comprises a balanced circuit of at least two vacuum tubes having their cathodes and plates tied back-to-back, one cathode-plate couple being grounded, another cathode-plate couple being connected to the said fixed resistor of the voltage divider and to the control point of said fixed gain amplifier stage, the control grid of the vacuum tube whose cathode is grounded and of the vacuum tube whose cathode is tied to said fixed resistor being connected to the output of said rectifier-filter network and through a second fixed resistor to a source of negative bias voltage. In one embodiment of the electronic resistor two vacuum tubes are employed, the control grids of the two tubes being tied to the output of the rectifier-filter network as aforesaid, the plate of one tube and the cathode of the other tube being grounded and the remaining cathode and plate being tied to the fixed resistor of the voltage divider and to the control point of the fixed gain amplifier stage.

In the preferred embodiment of the invention four vacuum tubes are employed; the cathode of the first tube, the plate of the second tube and the control grids of the second and fourth tubes are tied to ground, the cathode of the second tube is tied to the plate of the third tube, the cathode of the fourth tube is tied to the plate of the first tube, the cathode of the third tube and the plate of the fourth tube are connected to the first named fixed resistor and to the control point of the fixed gain amplifier stage and the control grids of the first and third vacuum tubes are connected to the output of the rectifier-filter network and to a source of negative bias potential through a second fixed resistor.

It is of course well known to employ an automatic volume control loop similar to the one described herein, wherein a rectified sample voltage is fed onto the control grid of a single vacuum tube whose plate is tied into the AVC control point but such prior practice has had the disadvantage of producing a surge whenever a change in signal level was encountered. By providing a balanced tube circuit in accordance with the present invention no appreciable surge is experienced.

The principal advantage of the automatic volume control circuit of this invention is that it enables control of signals from high impedance circuits. This enables the AC amplifier circuit to function as a voltage amplifier rather than a current amplifier, making it possible to reduce the size and complexity of the various components of the circuit and at the same time reduce the power requirements. This is of particular advantage in equipment employed in seismic studies since it reduces the weight of the equipment which must necessarily be transported from place to place. For the same reasons the circuit will find use in public address systems and in similar portable equipment.

It is to be understood, of course, that the particular embodiments of this invention described herein are by way of example and not by way of limitation and that the scope of the invention is not to be limited thereby but only by the following claims.

What is claimed is:

1. In an electronic amplifier circuit for seismic recording, including an automatic volume control network comprising a variable attenuation stage feeding the control point of a fixed gain amplifier stage wherein automatic volume control is effected by sampling the signal, amplifying the sampled signal and feeding back the amplified sample signal through a rectifier and filter network to the variable attenuation stage, an improved variable attenuation stage comprising a voltage divider consisting of a fixed resistor and an electronic resistor, said electronic resistor comprising a balanced circuit of at least two vacuum tubes having their cathodes and plates tied back-to-back, one tied cathode-plate pair being grounded, another tied cathode-plate pair being connected to the said fixed resistor of the voltage divider and to the control point of said fixed gain amplifier stage, the control grids of the vacuum tube whose cathode is grounded and of the vacuum tube whose cathode is tied to said fixed resistor being connected to the output of said rectifier-filter network and through a second fixed resistor to a source of negative bias potential.

2. Electronic amplifier circuit according to claim 1 in which said electronic resistor in said voltage divider comprises a balanced circuit of two vacuum tubes with the cathode of the first tube and the plate of the second tube grounded, the control grids of the two tubes tied to the output of the rectifier-filter network as aforesaid and the plate of the first tube and the cathode of the second tube tied to the first fixed resistor and to the control point of the fixed gain amplifier stage as aforesaid.

3. Improved amplifier circuit according to claim 1 in which said electronic resistor in said voltage divider comprises a balanced circuit of four vacuum tubes wherein the cathode of the first tube, the plate of the second tube and the control grids of the second and fourth tubes are tied to ground, the cathode of the second tube is tied to the plate of the third tube, the cathode of the fourth tube is tied to the plate of the first tube, the cathode of the third tube and the plate of the fourth tube are connected to the first named fixed resistor and to the control point of the fixed gain amplifier stage and the control grids of the first and third vacuum tubes are connected to the output of the rectifier-filter network and to a source of negative bias potential through a second fixed resistor as aforesaid.

CLARENCE B. SCOTT.

REFERENCES CITED

The following references are of record in the file of this patent:

UNITED STATES PATENTS

| Number | Name | Date |
| --- | --- | --- |
| 1,978,184 | Aubert | Oct. 23, 1934 |
| 2,164,939 | Pfister | July 4, 1939 |
| 2,263,683 | Rockwell | Nov. 25, 1941 |